(12) United States Patent
Kitamura et al.

(10) Patent No.: US 9,993,889 B2
(45) Date of Patent: Jun. 12, 2018

(54) OIL COMPOSITION FOR ELECTRICAL DISCHARGE MACHINING

(71) Applicants: IDEMITSU KOSAN CO., LTD., Chiyoda-ku (JP); Nagaoka University of Technology, Nagaoka-shi (JP)

(72) Inventors: Tomohiko Kitamura, Ichihara (JP); Yasushi Fukuzawa, Nagaoka (JP); Ken Yamashita, Nagaoka (JP); Daiki Hanaoka, Nagaoka (JP)

(73) Assignees: IDEMITSU KOSAN CO., LTD., Chiyoda-ku (JP); Nagaoka University of Technology, Nagaoka-shi (JP)

( * ) Notice: Subject to any disclaimer, the term of this patent is extended or adjusted under 35 U.S.C. 154(b) by 0 days. days.

(21) Appl. No.: 15/129,490

(22) PCT Filed: Mar. 27, 2015

(86) PCT No.: PCT/JP2015/059531
§ 371 (c)(1),
(2) Date: Sep. 27, 2016

(87) PCT Pub. No.: WO2015/152022
PCT Pub. Date: Oct. 8, 2015

(65) Prior Publication Data
US 2017/0173716 A1 Jun. 22, 2017

(30) Foreign Application Priority Data
Mar. 31, 2014 (JP) .................. 2014-074035

(51) Int. Cl.
*C10M 169/00* (2006.01)
*B23H 1/08* (2006.01)
(Continued)

(52) U.S. Cl.
CPC ............. *B23H 1/08* (2013.01); *C10M 119/02* (2013.01); *C10M 129/26* (2013.01);
(Continued)

(58) Field of Classification Search
CPC ...... C10M 2207/125; C10M 2203/024; C10N 2250/10; C10N 2240/201
(Continued)

(56) References Cited

U.S. PATENT DOCUMENTS

| 3,648,013 A | 3/1972 | Stayner et al. |
| 4,005,304 A | 1/1977 | Stayner |

(Continued)

FOREIGN PATENT DOCUMENTS

| DE | 10 2008 047 237 A1 | 3/2010 |
| JP | 03287309 | 12/1991 |

(Continued)

OTHER PUBLICATIONS

International Search Report dated Jun. 23, 2015 in PCT/JP2015/059531 filed Mar. 27, 2015.
(Continued)

*Primary Examiner* — Vishal Vasisth
(74) *Attorney, Agent, or Firm* — Oblon, McClelland, Maier & Neustadt, L.L.P.

(57) ABSTRACT

An electrical discharge machining oil composition of the invention includes an organic acid metal salt and a base oil, in which the organic acid metal salt is an organic acid salt of a metal having an electronegativity on Pauling scale of 2 or less, and the present composition has a volume resistivity at 80 degrees C. of $2 \times 10^{-5}$ TΩ·m or more and a kinematic viscosity at 40 degrees C. in a range from 0.5 mm$^2$/s to 10 mm$^2$/s.

15 Claims, 2 Drawing Sheets

(51) Int. Cl.
  *C10M 171/00* (2006.01)
  *C10M 129/26* (2006.01)
  *C10M 129/32* (2006.01)
  *C10M 129/40* (2006.01)
  *C10M 119/02* (2006.01)
  *C10M 169/06* (2006.01)

(52) U.S. Cl.
  CPC ........ *C10M 129/32* (2013.01); *C10M 129/40* (2013.01); *C10M 169/06* (2013.01); *C10M 171/00* (2013.01); *C10M 2203/022* (2013.01); *C10M 2203/024* (2013.01); *C10M 2203/1025* (2013.01); *C10M 2205/026* (2013.01); *C10M 2205/0285* (2013.01); *C10M 2207/12* (2013.01); *C10M 2207/122* (2013.01); *C10M 2207/126* (2013.01); *C10M 2219/044* (2013.01); *C10N 2210/01* (2013.01); *C10N 2210/02* (2013.01); *C10N 2240/201* (2013.01); *C10N 2240/401* (2013.01)

(58) Field of Classification Search
  USPC ....................................................... 508/534
  See application file for complete search history.

(56) References Cited

U.S. PATENT DOCUMENTS

| | | |
|---|---|---|
| 4,347,169 A | 8/1982 | Sato et al. |
| 5,569,394 A | 10/1996 | Fukuzawa |
| 2010/0243430 A1* | 9/2010 | Yan .......................... B23H 3/00 204/192.32 |

FOREIGN PATENT DOCUMENTS

| | | |
|---|---|---|
| JP | 10-296541 A | 11/1998 |
| JP | 3241936 B2 | 12/2001 |
| JP | 2002-46021 A | 2/2002 |
| JP | 2004-130485 A | 4/2004 |
| JP | 2005-103709 A | 4/2005 |

OTHER PUBLICATIONS

Extended European Search Report dated Oct. 25, 2017, in European Patent Application No. 15773903.8, filing date Mar. 27, 2015.

* cited by examiner

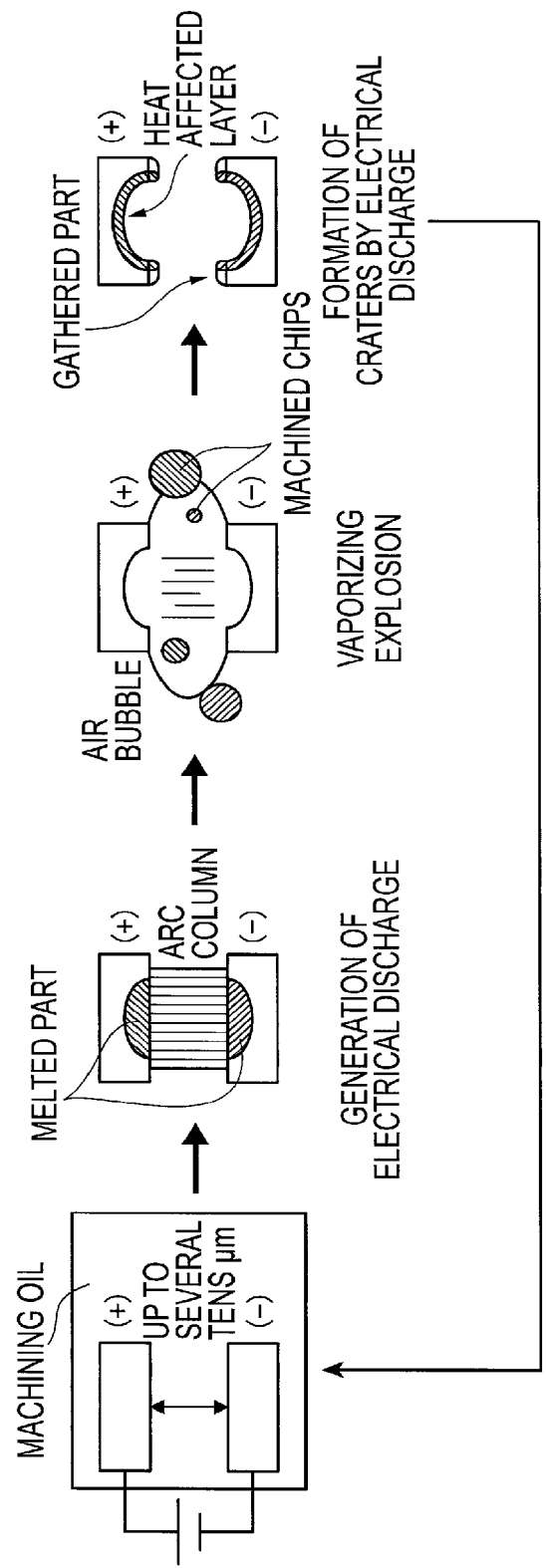

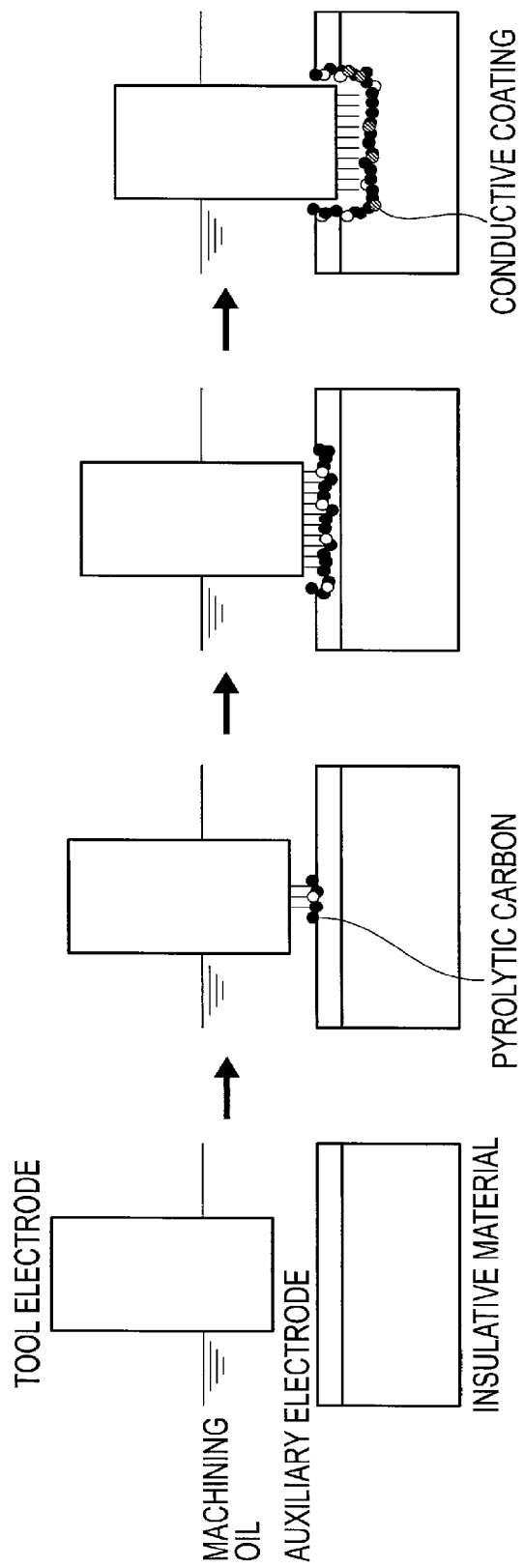

OIL COMPOSITION FOR ELECTRICAL DISCHARGE MACHINING

CROSS-REFERENCE TO RELATED APPLICATIONS

This application is a 371 of PCT/JP2015/059531, filed Mar. 27, 2015. This application is based upon and claims the benefit of priority to Japanese Application No. 2014-074035, which was filed on Mar. 31, 2014.

TECHNICAL FIELD

The present invention relates to an electrical discharge machining oil composition.

BACKGROUND ART

Electrical discharge machining is a method of machining a workpiece by repeatedly applying electrical discharge to the workpiece to continuously form craters. Specifically, an electrically conductive workpiece and an electrode are placed in a machining oil (an insulative solvent) in a manner to face each other with a predetermined interval (up to several tens of μm). The workpiece is brought into a high temperature condition by arc discharge to be melted. The melted workpiece is removed by vaporizing explosion of the heated and vaporized machining oil. (see FIG. 1) This electrical discharge machining allows the workpiece to be machined into a complicated shape. However, since a machining speed in the electrical discharge machining is lower than that in cutting, the machining speed in the electrical discharge machining needs to be improved.

Accordingly, in order to improve the machining speed, various electrodes for electrical discharge machining have been developed. For instance, there has been proposed an electrode material for electrical discharge machining, the electrode material being a Cu—W alloy and including at most 0.05% by weight of element(s) other than Ni, Cu and W, a boride or an oxide of the element(s), in which a W concentration is 40% by weight or more, and 30% or more of all W particles in the alloy has a particle diameter of 1 μm or less (see Patent Literature 1).

In general, the electrical discharge machining is applicable only to a metal material. A typical electrical discharge machining is not applicable to an insulative material (e.g., diamond, ruby, glass, ceramics and ultrapure silicon). However, the insulative material can also be machined by the electrical discharge machining with use of a so-called auxiliary electrode method. FIG. 2 shows an example of the electrical discharge machining with use of the auxiliary electrode method. With use of the auxiliary electrode method, for instance, extremely highly hard ceramics that is difficult in cutting can be machined as desired. Since a machining speed for the metal material is lower in the auxiliary electrode method than in a typical electrical discharge machining, a further improvement in the machining speed in the auxiliary electrode method is desired.

For instance, there has been proposed a machining method of an insulative material including: bringing a composite including a mesh conductive material and the like into a close contact with a surface of the insulative material; generating electrical discharge between the insulative material and a machining electrode to separate machined powders from the composite and attach the machined powders to the insulative material, thereby forming a conductive layer on the insulative material; and generating electrical discharge between the conductive layer and the machining electrode to machine the insulative material (see Patent Literature 2).

CITATION LIST

Patent Literature(s)

Patent Literature 1: JP-A-2004-130485
Patent Literature 2: U.S. Pat. No. 3,241,936

SUMMARY OF THE INVENTION

Problem(s) to be Solved by the Invention

The machining speed is not satisfactorily improved only by improving the electrode material as disclosed in Patent Literature 1. The machining oil itself also needs to be improved. Moreover, a further improvement in the machining speed is also required in the electrical discharge machining (auxiliary electrode method) applied to the insulative material as disclosed in Patent Literature 2.

An object of the invention is to provide an electrical discharge machining oil composition providing a sufficiently high machining speed in electrical discharge machining.

Means for Solving the Problem(s)

In order to solve the above problem, the invention provides an electrical discharge machining oil composition as follows.

According to an aspect of the invention, an electrical discharge machining oil composition includes: a base oil; and an organic acid metal salt, wherein the organic acid metal salt is a salt of an organic acid and a metal having an electronegativity on Pauling scale of 2 or less, and the composition has a volume resistivity at 80 degrees C. of $2 \times 10^{-5}$ TΩ·m or more and a kinematic viscosity at 40 degrees C. in a range from 0.5 mm$^2$/s to 10 mm$^2$/s.

According to the above aspect of the electrical discharge machining oil composition, the machining speed is sufficiently high to improve productivity. Moreover, with use of an auxiliary electrode method, a brittle material such as ceramics that is extremely difficult in cutting and a highly pure silicon can be machined as desired.

BRIEF DESCRIPTION OF DRAWING(S)

FIG. 1 shows an example of electrical discharge machining.

FIG. 2 shows an example of electrical discharge machining with use of an auxiliary electrode method.

DESCRIPTION OF EMBODIMENT(S)

An electrical discharge machining oil composition in an exemplary embodiment of the invention (hereinafter, simply referred to as "the present composition") is provided by blending an organic acid metal salt with a base oil, in which the organic acid metal salt is an organic acid salt of a metal having an electronegativity on Pauling scale of 2 or less, and the present composition has a volume resistivity at 80 degrees C. of $2 \times 10^{-5}$ TΩ·m or more and a kinematic viscosity at 40 degrees C. in a range from 0.5 mm$^2$/s to 10 mm$^2$/s. Details will be described below.

Base Oil

A base oil used for the present composition (hereinafter, also referred to as "the present base oil") may be a mineral and/or a synthetic oil as long as being insulative. Various kinds of mineral oils are usable as the mineral oil. Examples of the mineral oil include a paraffinic mineral oil, an intermediate mineral oil and a naphthenic mineral oil. Specific examples of the mineral oil include a light neutral oil, an intermediate neutral oil, a heavy neutral oil and bright stock which are obtained by solvent purification or hydrogenation purification. Various kinds of synthetic oils are usable as the synthetic oil. For instance, alpha-olefin, poly-alpha-olefin (including an alpha-olefin copolymer) and polybutene are usable.

As the present base oil, one kind of the mineral oil or the synthetic oil is usable alone or a combination of two kinds or more thereof are usable. Moreover, a combination of the mineral oil and the synthetic oil may be used.

The kinematic viscosity at 40 degrees C. of the present base oil is preferably in a range from 0.4 mm$^2$/s to 9.9 mm$^2$/s, more preferably from 1 mm$^2$/s to 8 mm$^2$/s, further preferably from 1.5 mm$^2$/s to 5 mm$^2$/s. Within the above viscosity range, the kinematic viscosity of the present composition described later is easily controllable to fall in the preferable range.

Organic Acid Metal Salt

The organic acid metal salt used for the present composition is an organic acid salt of a metal having an electronegativity on Pauling scale (hereinafter, simply referred to as "electronegativity") of 2 or less, preferably 1.7 or less, more preferably 1.6 or less. When the present composition contains the organic acid salt of the metal having an electronegativity of 1.7 or less, a machining speed by using the present composition is significantly improved.

In terms of the machining speed, the metal usable for the organic acid metal salt is preferably at least one of Zn, Ba, Ca, Na and K, particularly preferably Zn.

An organic acid usable for the organic acid salt is exemplified by organic sulfonic acid and carboxylic acid, among which carboxylic acid is preferable and monocarboxylic acid is more preferable in terms of solubility.

Preferably usable examples of the monocarboxylic acid include caproic acid, caprylic acid, nonanoic acid, capric acid, lauric acid, myristic acid, palmitic acid, palmitoleic acid, stearic acid, oleic acid, linoleic acid, linolenic acid, arachic acid, behenic acid, melissic acid, isononanoic acid, neodecanoic acid, and isostearic acid.

A content of the organic acid metal salt is preferably in a range from 0.5 mass % to 15 mass % of a total amount of the present composition, more preferably from 1 mass % to 10 mass %, further preferably from 2 mass % to 5 mass %. When the content of the organic acid metal salt is 0.5 mass % or more, the machining speed can be further increased. When the content of the organic acid metal salt is 15 mass % or less, the present composition can exhibit a suitable kinematic viscosity and a high insulation performance to further increase machining speed.

Present Composition

The present composition is provided by blending the organic acid metal salt with the base oil and has a volume resistivity at 80 degrees C. of 2×10$^{-5}$ TΩ·m or more. At the volume resistivity of 2×10$^{-5}$ TΩ·m or more, the machining speed can be more increased since the insulation performance is sufficiently high. The volume resistivity of the present composition is preferably 1×10$^{-4}$ TΩ·m or more, more preferably 1×10$^{-3}$ TΩ·m or more. Note that the volume resistivity may be measured in accordance with JIS C2101.

The kinematic viscosity at 40 degrees C. of the present composition is in a range from 0.5 mm$^2$/s to 10 mm$^2$/s, preferably from 1 mm$^2$/s to 8 mm$^2$/s, more preferably from 1.5 mm$^2$/s to 5 mm$^2$/s.

Since the kinematic viscosity at 40 degrees C. of the present composition is 0.5 mm$^2$/s or more, the machining speed can be increased and a risk of catching fire is lessened. Further, since the kinematic viscosity at 40 degrees C. of the present composition is 10 mm$^2$/s or less, the kinematic viscosity is not too high and the machining speed can be sufficiently increased. In other words, it is a crucial factor for improving the machining speed that the kinematic viscosity at 40 degrees C. of the present composition falls within the above range.

Since the present composition is provided by blending the above-described specific metal element with the base oil, a work function in the electrical discharge machining can be lowered and a wide working gap can be formed. Accordingly, machined chips and gas generated during the electrical discharge machining can be easily discharged and short-circuit and abnormal electrical discharge are less likely to occur, so that the machining speed is increased and a stable machining can be conducted.

Consequently, the present composition is suitably usable for so-called electrical discharge machining such as die-sinking electrical discharge machining and a wire-cut electrical discharge machining. Further, since the present composition provides an extremely high machining speed, the present composition is also suitably usable for machining an insulative and brittle material (e.g., diamond, ruby, glass, ceramics and ultrapure silicon) by the auxiliary electrode method.

Thickener

The present composition preferably contains a thickener in order to enhance a machining performance. In order to enhance the machining performance, a kinematic viscosity at 100 degrees C. of the thickener is preferably in a range from 100 mm$^2$/s to 10000 mm$^2$/s, more preferably from 100 mm$^2$/s to 8000 mm$^2$/s, further preferably from 1000 mm$^2$/s to 6000 mm$^2$/s. Moreover, the thickener is preferably liquid at 30 degrees C. in terms of solubility.

Examples of the thickener include a mineral oil, poly-alpha-olefin (PAO), polybutene, polyisobutylene, polyvinylacetate, polyalkylacrylate, ethylene-propylene copolymer and polyalkyleneglycol (PAG) derivative. One of the thickeners may be used alone, or a combination of any ones thereof may be used in a mixture.

A content of the thickener is preferably in a range from 0.5 mass % to 15 mass % of the total amount of the present composition, more preferably from 1 mass % to 10 mass %, further preferably from 2 mass % to 5 mass %. At the content of the thickener of 0.5 mass % or more, the machining speed can be sufficiently high. At the content of the thickener of 15 mass % or less, a thickening effect can be adequate and the machining speed can be kept sufficiently high.

Oil-Soluble Resin

The present composition preferably contains an oil-soluble resin in order to enhance the machining speed.

The oil-soluble resin preferably has a number average molecular weight in a range from 300 to 2000 in terms of the machining speed. Moreover, the oil-soluble resin is preferably solid at 30 degrees C. in order to improve the machining speed.

Examples of the oil-soluble resin include polymers such as dipentene, tetraterpene and polyterpene, or hydrides thereof; a cyclopentadiene-dicyclopentadiene copolymer petroleum resin or hydrides thereof; an ester of rosin; a coumarone resin; and a coumarone-indene resin. One of the oil-soluble resins may be used alone, or a combination of any ones thereof may be used in a mixture.

A content of the oil-soluble resin is preferably in a range from 0.5 mass % to 15 mass % of the total amount of the present composition, more preferably from 1 mass % to 10 mass %, further preferably from 2 mass % to 5 mass %. At the content of the oil-soluble resin of 0.5 mass % or more, the machining speed can be sufficiently high. At the content of the oil-soluble resin of 15 mass % or less, a viscosity of the present composition can also be adequate and the machining speed can be kept sufficiently high.

Other Additives

The present composition may further contain a rust inhibitor, an antifoaming agent, an antioxidant, and a metal deactivator as long as the advantages of the invention is not hampered.

Examples of the rust inhibitor include, alkylbenzene sulfonate, dinonylnaphthalene sulfonate, alkenyl succinic ester, and polyhydric alcohol ester. A content of the rust inhibitor is preferably approximately in a range from 0.01 mass % to 5 mass % in the total amount of the electrical discharge machining oil.

Examples of the antifoaming agent include silicone oil, fluorosilicone oil, and fluoroalkylether. A content of the antifoaming agent is preferably approximately in a range from 0.01 mass % to 5 mass % in the total amount of the present composition.

The antioxidant may be exemplified by a phenolic antioxidant and an amine antioxidant. Examples of the phenolic antioxidant include 4,4'-methylenebis(2,6-di-t-butylphenol) (DBPC); 4,4'-bis(2,6-di-t-butylphenol); 4,4'-bis(2-methyl-6-t-butylphenol); 2,2'-methylenebis(4-ethyl-6-t-butylphenol); 2,2'-methylenebis(4-methyl-6-t-butylphenol); 4,4'-butylidenebis(3-methyl-6-t-butylphenol); 4,4'-isopropylidenebis(2,6-di-t-butylphenol); 2,2'-methylenebis(4-methyl-6-nonylphenol); 2,2'-isobutylidenebis(4,6-dimethylphenol); 2,2'-methylenebis(4-methyl-6-cyclohexylphenol); 2,6-di-t-butyl-4-methylphenol; and 2,6-di-t-butyl-4-ethylphenol.

Examples of the amine antioxidant include: a monoalkyl diphenylamine antioxidant such as monooctyl diphenylamine and monononyl diphenylamine; a dialkyl di phenyl amine antioxidant such as 4,4'-dibutyl di phenyl amine, 4.4'-dipentyl diphenylamine, 4.4'-dihexyl diphenyl amine, 4.4'-diheptyl diphenyl amine, 4,4'-dioctyl diphenylamine and 4,4'-dinonyl diphenylamine; a polyalkyl diphenylamine antioxidant such as tetrabutyl diphenylamine, tetrahexyl diphenylamine, tetraoctyl diphenylamine and tetranonyl diphenylamine; and a naphthylamine antioxidant.

In the exemplary embodiment of the invention, one kind of the phenolic antioxidant or the amine antioxidant may be used alone, or a combination of two or more of the phenolic antioxidant and/or the amine antioxidant may be used. A content of the antioxidant is approximately in a range from 0.01 mass % to 5 mass % of the total amount of the present composition in terms of balance between antioxidant effects and economic performance.

The metal deactivator is mainly used as a copper anticorrosive agent. Examples of the metal deactivator include benzotriazole, imidazoline, pyrimidine derivatives, thiadiazole and thiadiazole. One of the above metal deactivators may be used alone or a combination of two or more thereof may be used. A content of the metal deactivator is preferably approximately in a range from 0.01 mass % to 1 mass % in the total amount of the present composition. Since an electrode of the electrical discharge machining device is typically made of copper, when the metal deactivator is contained at the content falling within the above range, a metal oxide (e.g., copper oxide) to be mixed at a minute amount into the electrical discharge machining oil is inhibited from acting as an oxidation catalyst.

Herein, in the invention, the composition defined as "a composition provided by blending the component (A) with the component (B)" means not only "a composition containing the component (A) and the component (B)" but also "a composition containing a modified substance, which is obtained by modifying at least one of the component (A) and the component (B), in place of the at least one of the component (A) and the component (B)," and "a composition containing a reactant obtained by reaction of the component (A) and the component (B)."

EXAMPLES

Next, the invention will be further described in detail with Examples, which by no means limit the invention.

Manufacturing Examples 1 to 2, Comparative Manufacturing Examples 1 to 4

Electrical discharge machining oil compositions (sample oils) were prepared using base oils and additives shown in Table 1 and evaluated as follows.

TABLE 1

|  |  | Manufacturing Example 1 | | Manufacturing Example 2 | | Comparative Manufacturing Example 1 | | Comparative Manufacturing Example 2 | Comparative Manufacturing Example 3 | Comparative Manufacturing Example 4 |
| --- | --- | --- | --- | --- | --- | --- | --- | --- | --- | --- |
|  |  | Example 1-1 | Example 1-2 | Example 2-1 | Example 2-2 | Comparative 1-1 | Comparative 1-2 | Comparative 2 | Comparative 3 | Comparative 4 |
| Blending Composition (mass %) | Synthetic oil 1[1)] | 94.0 |  | 97.0 |  | 100.0 |  | 97.0 | 97.0 | — |
|  | Synthetic oil 2[2)] | — | — | — | — | — | — | — | — | 97.0 |
|  | Thickener[3)] | 3.0 | — | — | — | — | — | — | — | — |
|  | Metal acid salt 1[4)] | 3.0 |  | 3.0 |  | — |  | — | — | 3.0 |
|  | Metal acid salt 2[5)] | — | — | — | — | — | — | 3.0 | — | — |
|  | Metal acid salt 3[6)] | — | — | — | — | — | — | — | 3.0 | — |

TABLE 1-continued

|  |  | Manufacturing Example 1 | | Manufacturing Example 2 | | Comparative Manufacturing Example 1 | | Comparative Manufacturing Example 2 | Comparative Manufacturing Example 3 | Comparative Manufacturing Example 4 |
|---|---|---|---|---|---|---|---|---|---|---|
|  |  | Example 1-1 | Example 1-2 | Example 2-1 | Example 2-2 | Comparative 1-1 | Comparative 1-2 | Comparative 2 | Comparative 3 | Comparative 4 |
| Properties | Kinematic viscosity at 40° C. (mm²/s) | 1.7 | | 1.4 | | 1.3 | | 1.4 | 1.4 | 11.8 |
|  | Volume resistivity (TΩ · m) | 0.2 | | 0.2 | | 130.0 | | 9 × 10⁻⁶ | 2 × 10⁻⁶ | 0.2 |
| Evaluation Results | Ceramics machining speed (mm³/min) | 0.23 | — | 0.18 | — | 0.11 | — | 0.05 | 0.06 | 0.09 |
|  | Steel machining speed (mm²/min) | — | 0.70 | — | 0.66 | — | 0.60 | — | — | — |

[1] Synthetic Oil 1: alpha-olefin having 12 carbon atoms (kinematic viscosity at 40 degrees C.: 1.2 mm²/s)
[2] Synthetic Oil 2: isoparaffin (kinematic viscosity at 40 degrees C.: 11.0 mm²/s)
[3] Thickener: polybutene (kinematic viscosity at 100 degrees C.: 4550 mm²/s)
[4] Metal Acid Salt 1: Zinc neodecanoate
[5] Metal Acid Salt 2: Ca sulfonate (Bryton C-500 manufactured by Crompton)
[6] Metal Acid Salt 3: Na sulfonate (LUBRIZOL 5318A manufactured by The Lubrizol Corporation, Japan)

Evaluation Method
(1) Kinematic Viscosity:
The kinematic viscosity was measured at a predetermined temperature in accordance with JIS K 2283.
(2) Volume Resistivity
The volume resistivity of each of the sample oils was measured in accordance with JIS C2101 under test conditions of a measurement temperature of 80 degrees C., an applied voltage of 250V and a measurement time of one minute.
(3) Electrical Discharge Machining Speed
An electrical discharge machining speed was measured by the following two methods with respect to each of the sample oils having blending compositions shown in Table 1. Evaluation results are shown in Table 1.
(3-1) Die-Sinking Electrical Discharge Machining Applied to Ceramics (Auxiliary Electrode Method)

Examples 1-1 and 2-1, Comparatives 1-1 and 2 to 4

Machined Material (Workpiece): Ceramics: $ZrO_2$ (Conductive treatment: 0.1 mm thick Cu coating)
Machining Conditions
Tool Electrode: Cu (diameter: 5.0 mm)
Non-Load Voltage (V): 100
Set Current (A): 4.2
Set Electrical Discharge Time (μs): 4
Quiescent Time (μs): 40
Servo Reference Voltage (SV): 60
Electrical Discharge Detection Voltage (V): 70
Electrode Jump Gap (ms): 3000
Jump Time (ms): 800
Electrode Rotation Speed (min⁻¹): 60
Evaluation Item
The electrical discharge machining speed was evaluated with reference to a removed volume per a unit time. Specifically, the removed volume was obtained from a difference between a workpiece mass before the machining and a workpiece mass after the machining. The workpiece mass was measured using an electronic scale balance.

$V = (W_1 - W_2)/t/\rho$

V: Machining speed (mm³/min)
$W_1$: Workpiece mass (g) before the machining
$W_2$: Workpiece mass (g) after the machining
t: Machining time (min)
ρ: Density (g/mm³)
(3-2) Wire Electrical Discharge Machining Applied to Steel Examples 1-2 and 2-2, Comparative 1-2

Machined Material (Workpiece): SKD11
Machining Conditions
Non-Load Voltage (V): 100
Set Current (A): 5.4
Set Electrical Discharge Time (μs): 2
Quiescent Time (μs): 20
Servo Reference Voltage (V): 60
Servo Speed (mm/min): 5
Evaluation Item: Machining Speed (mm²/s)
Evaluation Results
As understood from the results shown in Table 1, in both of the electrical discharge machining applied to ceramics by the auxiliary electrode method and the typical wire electrical discharge machining applied to steel, the machining speed is excellent when using the electrical discharge machining oil composition of the invention. Particularly, the sample oil containing a predetermined thickener in Manufacturing Example 1 provides an extremely high machining speed in both of the electrical discharge machining by the auxiliary electrode method and the typical wire electrical discharge machining.

The invention claimed is:
1. An electrical discharge machining method, comprising machining a brittle material using an auxiliary electrode method in the presence of an electrical discharge machining oil composition, wherein:

the electrical discharge machining oil composition consists essentially of a base oil, an organic acid metal salt, and at least one of a thickener, an oil-soluble resin, a rust inhibitor, an antifoaming agent, an antioxidant and a metal deactivator;

the organic acid metal salt is a salt of an organic acid and a metal having an electronegativity on Pauling scale of 2 or less; and the composition has a volume resistivity at 80 degrees C. of $2 \times 10^{-5}$ TΩ·m or more and a kinematic viscosity at 40 degrees C. ranging from 0.5 mm$^2$/s to 10 mm$^2$/s.

2. The electrical discharge machining method according to claim 1, wherein a content of the organic acid metal salt ranges from 0.5 mass % to 15 mass % in a total amount of the composition.

3. The electrical discharge machining method according to claim 1, wherein the organic acid is carboxylic acid.

4. The electrical discharge machining method according to claim 3, wherein the carboxylic acid is monocarboxylic acid.

5. The electrical discharge machining method according to claim 1, wherein the base oil has a kinematic viscosity at 40 degrees C. ranging from 0.4 mm$^2$/s to 9.9 mm$^2$/s.

6. The electrical discharge machining method according to claim 1, wherein the metal of the organic acid metal salt is at least one of Zn, Ba, Ca, Na and K.

7. The electrical discharge machining method according to claim 1, wherein:

the composition includes the thickener; and the thickener has a kinematic viscosity at 100 degrees C. ranging from 10 mm$^2$/s to 10,000 mm$^2$/s.

8. The electrical discharge machining method according to claim 7, wherein a content of the thickener ranges from 0.5 mass % to 15 mass % in the total amount of the composition.

9. The electrical discharge machining method according to claim 1, wherein the composition is adapted to function as an oil composition for machining the brittle material by the auxiliary electrode method.

10. The electrical discharge machining method according to claim 1, wherein the brittle material is an insulative brittle material.

11. The electrical discharge machining method according to claim 1, wherein the brittle material is at least one material selected from the group consisting of diamond, ruby, a glass, a ceramic and an ultrapure silicon.

12. The electrical discharge machining method according to claim 1, wherein the machining occurs at a machining speed ranging from 0.18 mm$^3$/min to 0.70 mm$^3$/min.

13. The electrical discharge machining method according to claim 1, wherein the brittle material is a ceramic, and the machining occurs at a machining speed ranging from 0.18 mm$^3$/min to 0.23 mm$^3$/min.

14. The electrical discharge machining method according to claim 1, wherein the brittle material is a steel, and the machining occurs at a machining speed ranging from 0.66 mm$^3$/min to 0.70 mm$^3$/min.

15. The electrical discharge machining method according to claim 1, wherein the electrical discharge machining oil composition consists of the base oil, the organic acid metal salt, and at least one of the thickener, the oil-soluble resin, the rust inhibitor, the antifoaming agent, the antioxidant and the metal deactivator.

\* \* \* \* \*